(12) United States Patent
Rached

(10) Patent No.: US 9,267,066 B2
(45) Date of Patent: Feb. 23, 2016

(54) REFRIGERANTS CONTAINING (E)-1,1,1,4,4,4-HEXAFLUOROBUT-2-ENE

(75) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 13/989,437

(22) PCT Filed: Nov. 8, 2011

(86) PCT No.: PCT/FR2011/052589
§ 371 (c)(1),
(2), (4) Date: Jun. 13, 2013

(87) PCT Pub. No.: WO2012/069725
PCT Pub. Date: May 31, 2012

(65) Prior Publication Data
US 2013/0255284 A1    Oct. 3, 2013

(30) Foreign Application Priority Data

Nov. 25, 2010   (FR) .................................. 10 59728

(51) Int. Cl.
| | | |
|---|---|---|
| C09K 5/04 | (2006.01) | |
| F25B 39/02 | (2006.01) | |
| F25B 1/00 | (2006.01) | |
| F25B 29/00 | (2006.01) | |

(52) U.S. Cl.
CPC . *C09K 5/045* (2013.01); *F25B 1/00* (2013.01); *F25B 29/003* (2013.01); *C09K 2205/11* (2013.01); *C09K 2205/112* (2013.01); *C09K 2205/12* (2013.01); *C09K 2205/126* (2013.01); *C09K 2205/22* (2013.01)

(58) Field of Classification Search
CPC .............. C09K 5/045; C09K 2205/22; C09K 2205/43; F25B 39/02; F25B 45/00
USPC .............................. 252/67, 68, 69; 62/77, 119
See application file for complete search history.

(56) References Cited

U.S. PATENT DOCUMENTS

| | | | |
|---|---|---|---|
| 5,076,064 A | 12/1991 | Kopko | |
| 7,708,903 B2 * | 5/2010 | Sievert et al. | 252/68 |
| 7,972,524 B2 | 7/2011 | Robin | |
| 7,972,525 B2 | 7/2011 | Robin | |
| 8,262,924 B2 | 9/2012 | Robin | |
| 8,648,123 B2 | 2/2014 | Van Horn et al. | |
| 2007/0096051 A1 * | 5/2007 | Nappa et al. | 252/2 |
| 2007/0100009 A1 * | 5/2007 | Creazzo et al. | 521/98 |
| 2007/0100010 A1 * | 5/2007 | Creazzo et al. | 521/98 |
| 2007/0108403 A1 | 5/2007 | Sievert et al. | |
| 2007/0187639 A1 | 8/2007 | Leck et al. | |
| 2009/0143604 A1 | 6/2009 | Nappa et al. | |
| 2009/0204444 A1 * | 8/2009 | Tucker et al. | 705/4 |
| 2009/0302264 A1 | 12/2009 | Serrano et al. | |
| 2010/0056124 A1 | 3/2010 | Keating et al. | |
| 2010/0078585 A1 | 4/2010 | Robin | |
| 2010/0112328 A1 * | 5/2010 | Van Horn et al. | 428/304.4 |
| 2010/0154419 A1 | 6/2010 | Kontomaris | |
| 2010/0163776 A1 * | 7/2010 | Robin | 252/2 |
| 2010/0216904 A1 | 8/2010 | Loh et al. | |
| 2010/0243943 A1 | 9/2010 | Robin | |
| 2010/0326095 A1 | 12/2010 | Van Horn et al. | |
| 2011/0001080 A1 | 1/2011 | Van Horn et al. | |
| 2011/0006248 A1 * | 1/2011 | Van Horn et al. | 252/68 |
| 2011/0088418 A1 * | 4/2011 | Kontomaris et al. | 62/101 |
| 2011/0144216 A1 | 6/2011 | Hulse et al. | |
| 2011/0197604 A1 | 8/2011 | Minor et al. | |
| 2011/0215273 A1 | 9/2011 | Uenveren et al. | |
| 2011/0237844 A1 * | 9/2011 | Tung et al. | 570/151 |
| 2011/0260093 A1 | 10/2011 | Robin | |
| 2012/0004299 A1 | 1/2012 | Hulse et al. | |
| 2012/0056124 A1 | 3/2012 | Robin | |
| 2012/0085959 A1 | 4/2012 | Uenveren et al. | |
| 2012/0117990 A1 * | 5/2012 | Rached et al. | 62/115 |
| 2012/0119136 A1 * | 5/2012 | Yana Motta et al. | 252/67 |
| 2013/0098396 A1 * | 4/2013 | Lousenberg et al. | 134/6 |
| 2013/0099154 A1 * | 4/2013 | Boussand et al. | 252/68 |
| 2013/0104575 A1 * | 5/2013 | Kontomaris | 62/79 |
| 2013/0111970 A1 * | 5/2013 | Johnsen | 73/1.06 |
| 2013/0247602 A1 * | 9/2013 | Boutier et al. | 62/115 |
| 2013/0255284 A1 | 10/2013 | Rached | |
| 2013/0298581 A1 * | 11/2013 | Kontomaris | 62/98 |
| 2014/0048739 A1 * | 2/2014 | Rached et al. | 252/67 |
| 2014/0083119 A1 * | 3/2014 | Rached | 62/79 |
| 2014/0191153 A1 * | 7/2014 | Yana Motta et al. | 252/67 |
| 2014/0284516 A1 * | 9/2014 | Johnsen | 252/67 |

FOREIGN PATENT DOCUMENTS

| | | |
|---|---|---|
| JP | 2008-531836 A | 8/2008 |
| JP | 2010-522816 A | 7/2010 |
| JP | 2010-532395 A | 10/2010 |
| WO | WO 2006/094303 A2 | 9/2006 |

(Continued)

OTHER PUBLICATIONS

U.S. Appl. No. 14/390,609, Rached.
Office Action issued by the European Patent office in EP 10 816 413.8, Apr. 28, 2014, 4 pages.
Kim, M.S., et al., "A Study to Determine the Existence of an Azeotropic R-22 'Drop-in' Substitute," NISTIR 5784, Mar. 1996, 50 pages, U.S. Department of Commerce.
Rached, U.S. Appl. No. 14/390,609 entitled "Compositions Based on 2,3,3,4,4,4-hexafluorobut-1-ene," filed in the U.S. Patent and Trademark Office on Oct. 3, 2014.
Rached, Wissam, U.S. Appl. No. 14/844,583 entitled "Compositions of 2,4,4,4-Tetrafluorobut-1-ENE and CIS-1,1,1,4,4,4-Hexafluorobut-2-ENE," filed in the U.S. Patent and Trademark Office on Sep. 3, 2015.

(Continued)

*Primary Examiner* — Douglas McGinty
(74) *Attorney, Agent, or Firm* — Buchanan Ingersoll & Rooney P.C.

(57) ABSTRACT

The invention relates to a composition comprising (E)-1,1,1,4,4,4-hexafluorobat-2-ene as a mixture with at least one hydrocarbon, hydrofinorocarbon or fluoroolefin compound having a boiling point less than or equal to −12° C., and also to the use of this composition as a heat transfer fluid.

15 Claims, No Drawings

(56) References Cited

FOREIGN PATENT DOCUMENTS

| | | |
|---|---|---|
| WO | WO 2007/002625 A2 | 1/2007 |
| WO | WO 2007/002703 A2 | 1/2007 |
| WO | WO 2007/053697 A2 | 5/2007 |
| WO | WO 2008/121776 A1 | 10/2008 |
| WO | WO 2008/134061 A2 | 11/2008 |
| WO | WO 2008/154612 A1 | 12/2008 |
| WO | WO 2009/085937 A1 | 7/2009 |
| WO | WO 2009/114397 A2 | 9/2009 |
| WO | WO 2009/114398 A1 | 9/2009 |
| WO | WO 2009108547 A1 * | 9/2009 |
| WO | WO 2010/055146 A2 | 5/2010 |
| WO | WO 2010/059677 A2 | 5/2010 |
| WO | WO 2010/062888 A2 | 6/2010 |
| WO | WO 2010/080467 A2 | 7/2010 |
| WO | WO 2010/100254 A1 | 9/2010 |
| WO | WO 2010/129461 A2 | 11/2010 |
| WO | WO 2010/141527 A1 | 12/2010 |
| WO | WO 2010/141669 A1 | 12/2010 |
| WO | WO 2011/015737 A1 | 2/2011 |
| WO | WO 2011/084447 A2 | 7/2011 |
| WO | WO 2011/084553 A2 | 7/2011 |
| WO | WO 2011/137087 A1 | 11/2011 |
| WO | WO 2012/064477 A2 | 5/2012 |
| WO | WO 2012/069725 A1 | 5/2012 |
| WO | WO 2012/075910 A1 | 6/2012 |
| WO | WO 2013/004930 A1 | 1/2013 |

OTHER PUBLICATIONS

Rached, Wissam, et al., U.S. Appl. No. 14/861,073 entitled "Compositions of Chloro-Trifluoropropene and Hexafluorobutene," filed in the U.S. Patent and Trademark Office Sep. 22, 2015.

* cited by examiner

REFRIGERANTS CONTAINING (E)-1,1,1,4,4,4-HEXAFLUOROBUT-2-ENE

This application claims priority to and is the national phase under 35 USC §371 of prior PCT International Application Number PCT/FR2011/052589 filed Nov. 8, 2011 which designated the United States of America and claimed priority to French Patent Application serial number 1059728 filed Nov. 25, 2010.

FIELD OF THE INVENTION

The present invention relates to compositions containing (E)-1,1,1,4,4,4-hexafluorobut-2-ene as a mixture with at least one other hydrocarbon compound or hydrocarbon derivative, and the use thereof as heat-transfer fluids.

TECHNICAL BACKGROUND

Fluids based on fluorocarbon compounds are largely used in vapor-compression heat-transfer systems, in particular air conditioning, heat pump, refrigeration and freezing devices. These devices have in common the fact that they are based on a thermodynamic cycle comprising the vaporization of the fluid at low pressure (in which the fluid absorbs heat); the compression of the vaporized fluid up to a high pressure; the condensation of the vaporized fluid to liquid at high pressure (in which the fluid releases heat); and the expansion of the fluid in order to complete the cycle.

The choice of a heat-transfer fluid (which may be a pure compound or a mixture of compounds) is dictated, on the one hand, by the thermodynamic properties of the fluid, and on the other hand, by additional constraints. Thus, one particularly important criterion is that of the impact of the fluid under consideration on the environment. In particular, chlorinated compounds (chlorofluorocarbons and hydrochlorofluorocarbons) have the disadvantage of damaging the ozone layer. Henceforth, generally non-chlorinated compounds such as hydrofluorocarbons, fluoroethers and fluoroolefins are therefore preferred to them.

It is, however, necessary to develop other heat-transfer fluids that have a global warming potential (GWP) lower than that of the heat-transfer fluids currently used, and that have equivalent or improved performance levels.

Document WO 2007/053697 describes fluoroolefin-based compositions in various uses, and in particular as heat-transfer fluids. The document mentions 1,1,1,4,4,4-hexafluorobut-2-ene.

Document WO 2008/134061 describes azeotropic or azeotrope-like compositions comprising (Z)-1,1,1,4,4,4-hexafluorobut-2-ene in combination with methyl formate, pentane, 2-methylbutane, 1,1,1,3,3-pentafluorobutane, trans-1,2-dichloroethylene or 1,1,1,3,3-pentafluoropropane.

Document WO 2008/154612 describes azeotropic or azeotrope-like compositions comprising (E)-1,1,1,4,4,4-hexafluorobut-2-ene in combination with methyl formate, n-pentane, 2-methylbutane, trans-1,2-dichloroethylene, 1,1,1,3,3-pentafluoropropane, n-butane or isobutane.

Document WO 2010/055146 describes fluoroolefins and the process for producing them. The document mentions in particular (E)-1,1,1,4,4,4-hexafluorobut-2-ene.

Document WO 2010/100254 describes tetrafluorobutenes, optionally as a mixture with hexafluorobutenes, and the use thereof in various applications, including heat transfer.

However, there is still a need to develop other heat-transfer fluids which have a relatively low GWP and which are capable of replacing the usual heat-transfer fluids.

In particular, it is desirable to develop other heat-transfer fluids with a low GWP which are azeotrope-like and/or which exhibit good energy performance levels compared with usual heat-transfer fluids (such as isobutane) and/or improved energy performance levels compared with the known heat-transfer fluids with a low GWP (such as 1,3,3,3-tetrafluoropropene).

SUMMARY OF THE INVENTION

The invention relates first and foremost to a composition comprising (E)-1,1,1,4,4,4-hexafluorobut-2-ene as a mixture with at least one hydrocarbon, hydrofluorocarbon, ether, hydrofluoroether or fluoroolefin compound having a boiling point less than or equal to −12° C.

According to one embodiment, the compound is chosen from 1,3,3,3-tetrafluoropropene, 2,3,3,3-tetrafluoropropene, 3,3,3-trifluoropropene, 1,1,1,2-fluoroethane, 1,1-difluoroethane, difluoromethane, pentafluoroethane, propane and dimethyl ether, and mixtures thereof.

According to one embodiment, the composition consists of a mixture of:
- (E)-1,1,1,4,4,4-hexafluorobut-2-ene and a compound chosen from 1,3,3,3-tetrafluoropropene, 2,3,3,3-tetrafluoropropene, 3,3,3-trifluoropropene, 1,1,1,2-tetrafluoroethane, 1,1-difluoroethane, difluoromethane, pentafluoroethane, dimethyl ether and propane; or
- (E)-1,1,1,4,4,4-hexafluorobut-2-ene and two compounds chosen from 1,3,3,3-tetrafluoropropene, 2,3,3,3-tetrafluoropropene, 3,3,3-trifluoropropene, 1,1,1,2-tetrafluoroethane, 1,1-difluoroethane, difluoromethane, pentafluoroethane, propane, dimethyl ether and isobutane.

According to one embodiment, the composition comprises and preferably consists of a mixture of:
- (E)-1,1,1,4,4,4-hexafluorobut-2-ene and 1,3,3,3-tetrafluoropropene;
- (E)-1,1,1,4,4,4-hexafluorobut-2-ene and 2,3,3,3-tetrafluoropropene;
- (E)-1,1,1,4,4,4-hexafluorobut-2-ene and 3,3,3-trifluoropropene;
- (E)-1,1,1,4,4,4-hexafluorobut-2-ene and 1,1,1,2-tetrafluoroethane;
- (E)-1,1,1,4,4,4-hexafluorobut-2-ene and 1,1-difluoroethane;
- (E)-1,1,1,4,4,4-hexafluorobut-2-ene and difluoromethane;
- (E)-1,1,1,4,4,4-hexafluorobut-2-ene and propane;
- (E)-1,1,1,4,4,4-hexafluorobut-2-ene, 1,1,1,2-tetrafluoethane and 1,3,3,3-tetrafluoropropene;
- (E)-1,1,1,4,4,4-hexafluorobut-2-ene, 1,1,1,2-tetrafluoroethane and 2,3,3,3-tetrafluoropropene;
- (E)-1,1,1,4,4,4-hexafluorobut-2-ene, 1,1,1,2-tetrafluoroethane and 1,1-difluoroethane;
- (E)-1,1,1,4,4,4-hexafluorobut-2-ene, 1,1,1,2-tetrafluoroethane and 3,3,3-trifluoropropene;
- (E)-1,1,1,4,4,4-hexafluorobut-2-ene, 1,1,1,2-tetrafluoroethane and isobutane;
- (E)-1,1,1,4,4,4-hexafluorobut-2-ene, 1,1,1,2-tetrafluoroethane and propane;
- (E)-1,1,1,4,4,4-hexafluorobut-2-ene, isobutane and 1,3,3,3-tetrafluoropropene;
- (E)-1,1,1,4,4,4-hexafluorobut-2-ene, isobutane and 2,3,3,3-tetrafluoropropene;
- (E)-1,1,1,4,4,4-hexafluorobut-2-ene, isobutane and 1,1-difluoroethane;
- (E)-1,1,1,4,4,4-hexafluorobut-2-ene, isobutane and propane;

(E)-1,1,1,4,4,4-hexafluorobut-2-ene, 3,3,3-trifluoropropene and 2,3,3,3-tetrafluoropropene;
(E)-1,1,1,4,4,4-hexafluorobut-2-ene, 3,3,3-trifluoropropene and 1,3,3,3-tetrafluoropropene;
(E)-1,1,1,4,4,4-hexafluorobut-2-ene, 3,3,3-trifluoropropene and isobutane;
(E)-1,1,1,4,4,4-hexafluorobut-2-ene, 3,3,3-trifluoropropene and 1,1-difluoroethane;
(E)-1,1,1,4,4,4-hexafluorobut-2-ene, 3,3,3-trifluoropropene and propane;
(E)-1,1,1,4,4,4-hexafluorobut-2-ene, 1,3,3,3-tetrafluoropropene and 2,3,3,3-tetrafluoropropene;
(E)-1,1,1,4,4,4-hexafluorobut-2-ene, 1,3,3,3-tetrafluoropropene and propane;
(E)-1,1,1,4,4,4-hexafluorobut-2-ene, 1,3,3,3-tetrafluoropropene and 1,1-difluoroethane;
(E)-1,1,1,4,4,4-hexafluorobut-2-ene, 2,3,3,3-tetrafluoropropene and propane;
(E)-1,1,1,4,4,4-hexafluorobut-2-ene, 2,3,3,3-tetrafluoropropene and 1,1-difluoroethane;
(E)-1,1,1,4,4,4-hexafluorobut-2-ene, 1,1-difluoroethane and propane;
(E)-1,1,1,4,4,4-hexafluorobut-2-ene, pentafluoroethane and 1,3,3,3-tetrafluoropropene;
(E)-1,1,1,4,4,4-hexafluorobut-2-ene, pentafluoroethane and 2,3,3,3-tetrafluoropropene;
(E)-1,1,1,4,4,4-hexafluorobut-2-ene, pentafluoroethane and 3,3,3-trifluoropropene;
(E)-1,1,1,4,4,4-hexafluorobut-2-ene, pentafluoroethane and 1,1-difluoroethane;
(E)-1,1,1,4,4,4-hexafluorobut-2-ene, pentafluoroethane and difluoromethane;
(E)-1,1,1,4,4,4-hexafluorobut-2-ene, pentafluoroethane and 1,1,1,2-tetrafluoroethane.

According to one embodiment, the difference between the liquid saturation pressure and the vapor saturation pressure of the composition at a temperature of -5° C. is less than or equal to 10% of the liquid saturation pressure, and preferably the composition comprises or consists of:
from 1% to 8% of (E)-1,1,1,4,4,4-hexafluorobut-2-ene and from 92% to 99% of 2,3,3,3-tetrafluoropropene; or
from 1% to 12% of (E)-1,1,1,4,4,4-hexafluorobut-2-ene and from 88% to 99% of 1,3,3,3-tetrafluoropropene; or
from 1% to 9% of (E)-1,1,1,4,4,4-hexafluorobut-2-ene and from 91% to 99% of 1,1,1,2-tetrafluoroethane; or
from 1% to 6% of (E)-1,1,1,4,4,4-hexafluorobut-2-ene and from 94% to 99% of difluoromethane; or
from 1% to 17% of (E)-1,1,1,4,4,4-hexafluorobut-2-ene and from 83% to 99% of 1,1-difluoroethane; or
from 1% to 26% of (E)-1,1,1,4,4,4-hexafluorobut-2-ene and from 74% to 99% of propane; or
from 1% to 10% of (E)-1,1,1,4,4,4-hexafluorobut-2-ene and from 90% to 99% of 3,3,3-trifluoropropene; or
from 1% to 10% of (E)-1,1,1,4,4,4-hexafluorobut-2-ene, from 1% to 98% of 1,1,1,2-tetrafluoroethane and from 1% to 98% of 1,3,3,3-tetrafluoropropene; or
from 1% to 8% of (E)-1,1,1,4,4,4-hexafluorobut-2-ene, from 1% to 98% of 1,1,1,2-tetrafluoroethane and from 1% to 98% of 2,3,3,3-tetrafluoropropene; or
from 1% to 15% of (E)-1,1,1,4,4,4-hexafluorobut-2-ene, from 1% to 98% of 1,1,1,2-tetrafluoroethane and from 1% to 98% of 1,1-difluoroethane; or
from 1% to 8% of (E)-1,1,1,4,4,4-hexafluorobut-2-ene, from 1% to 98% of 2,3,3,3-tetrafluoropropene and from 1% to 98% of 3,3,3-trifluoropropene; or
from 1% to 8% of (E)-1,1,1,4,4,4-hexafluorobut-2-ene, from 1% to 98% of 1,1,1,2-tetrafluoroethane and from 1% to 98% of 3,3,3-trifluoropropene; or
from 1% to 8% of (E)-1,1,1,4,4,4-hexafluorobut-2-ene, from 1% to 98% of 2,3,3,3-tetrafluoropropene and from 1% to 98% of 1,3,3,3-tetrafluoropropene; or
from 1% to 20% of (E)-1,1,1,4,4,4-hexafluorobut-2-ene, from 1% to 30% of 1,1,1,2-tetrafluoroethane and from 50% to 98% of propane; or
from 1% to 20% of (E)-1,1,1,4,4,4-hexafluorobut-2-ene, from 1% to 98% of 2,3,3,3-tetrafluoropropene and from 1% to 98% of propane; or
from 1% to 13% of (E)-1,1,1,4,4,4-hexafluorobut-2-ene, from 1% to 98% of 2,3,3,3-tetrafluoropropene and from 1% to 98% of 1,1-difluoroethane; or
from 1% to 15% of (E)-1,1,1,4,4,4-hexafluorobut-2-ene, from 1% to 98% of 1,3,3,3-tetrafluoropropene and from 1% to 98% of 1,1-difluoroethane; or
from 1% to 20% of (E)-1,1,1,4,4,4-hexafluorobut-2-ene, from 1% to 98% of 1,3,3,3-tetrafluoropropene and from 1% to 98% of propane.

According to one embodiment, the composition comprises and preferably consists of:
from 10% to 50% of (E)-1,1,1,4,4,4-hexafluorobut-2-ene and from 50% to 90% of 1,3,3,3-tetrafluoropropene, preferably from 30% to 40% of (E)-1,1,1,4,4,4-hexafluorobut-2-ene and from 60% to 70% of 1,3,3,3-tetrafluoropropene: or
from 55% to 95% of (E)-1,1,1,4,4,4-hexafluorobut-2-ene and from 5% to 45% of 1,1,1,2-tetrafluoroethane; or
from 1% to 98% of (E)-1,1,1,4,4,4-hexafluorobut-2-ene, from 1% to 98% of 2,3,3,3-tetrafluoropropene and from 1% to 50% of 1,1,1,2-tetrafluoroethane, preferably from 2% to 60% of (E)-1,1,1,4,4,4-hexafluorobut-2-ene, from 2% to 93% of 2,3,3,3-tetrafluoropropene and from 5% to 50% of 1,1,1,2-tetrafluoroethane and more particularly preferably from 5% to 45% of (E)-1,1,1,4,4,4-hexafluorobut-2-ene, from 11% to 86% of 2,3,3,3-tetrafluoropropene and from 9% to 44% of 1,1,1,2-tetrafluoroethane; or
from 1% to 98% of (E)-1,1,1,4,4,4-hexafluorobut-2-ene, from 1% to 98% of 1,3,3,3-tetrafluoropropene and from 1% to 40% of 1,1,1,2-tetrafluoroethane, preferably from 2% to 40% of (E)-1,1,1,4,4,4-hexafluorobut-2-ene, from 20% to 93% of 1,3,3,3-tetrafluoropropene and from 5% to 40% of 1,1,1,2-tetrafluoroethane and more particularly preferably from 2% to 35% of (E)-1,1,1,4,4,4-hexafluorobut-2-ene, from 33% to 89% of 1,3,3,3-tetrafluoropropene and from 9% to 32% of 1,1,1,2-tetrafluoroethane.

The invention also relates to the use of the composition above, as a heat-transfer fluid.

The invention also relates to a heat-transfer composition comprising the composition above and also one or more additives chosen from lubricants, stabilizers, surfactants, tracers, fluorescent agents, odorous agents and solubilizing agents, and mixtures thereof.

The invention also relates to heat-transfer equipment comprising a vapor compression circuit containing a composition as described above as heat-transfer fluid or containing a heat-transfer composition as described above.

According to one embodiment, the equipment is chosen from mobile or stationary heat-pump heating, air conditioning, refrigeration and freezing equipment and Rankine cycles.

The invention also relates to a process for heating or cooling a fluid or a body by means of a vapor compression circuit containing a heat-transfer fluid, said process successively comprising evaporation of the heat-transfer fluid, compression of the heat-transfer fluid, condensation of the heat-transfer fluid and expansion of the heat-transfer fluid, wherein the heat-transfer fluid is a composition as described above.

According to one embodiment, this process is a process for cooling a fluid or a body, wherein the temperature of the fluid or of the body cooled is from −15° C. to 15° C., preferably from −10° C. to 10° C. and more particularly preferably from −5° C. to 5° C.; or is a process for heating a fluid or a body, wherein the temperature of the fluid or of the body heated is from 30° C. to 90° C., preferably from 35° C. to 60° C. and more particularly preferably from 40° C. to 50° C.

The invention also relates to a process for reducing the environmental impact of heat-transfer equipment comprising a vapor compression circuit containing an initial heat-transfer fluid, said process comprising a step of replacing the initial heat-transfer fluid in the vapor compression circuit with a final heat-transfer fluid, the final heat-transfer fluid having a GWP lower than the initial heat-transfer fluid, in which the final heat-transfer fluid is a composition as described above.

The present invention makes it possible to overcome the drawbacks of the prior art. It more particularly provides heat-transfer fluids with a low GWP, capable of replacing the usual heat-transfer fluids.

In particular, in certain embodiments, the invention provides azeotrope-like heat-transfer fluids. In certain embodiments, the invention provides heat-transfer fluids which have good energy performance levels compared with usual heat-transfer fluids and/or have improved energy performance levels compared with known heat-transfer fluids with a low GWP (in particular compared with 1,3,3,3-tetrafluoropropene).

This is accomplished by virtue of mixtures comprising, on the one hand, 1,1,1,4,4,4-hexafluorobut-2-ene in trans form and, on the other hand, at least one hydrocarbon, hydrofluorocarbon or fluoroolefin compound having a boiling point less than or equal to −12° C. This compound is preferably chosen from 1 3 3,3-tetrafluoropropene, 2,3,3,3-tetrafluoropropene, 3,3,3-trifluoropropene, 1,1,1,2-tetrafluoroethane, 1,1-difluoroethane, difluoromethane and propane, and mixtures thereof.

The compositions according to the invention have an improved volumetric capacity compared with the compositions disclosed in document WO 2008/154612 (in which the compounds combined with (E)-1,1,1,4,4,4-hexafluorobut-2-ene have a boiling point greater than -12° C.).

The compositions according to the invention also have a volumetric capacity that is greater than analogous compositions in which the (E)-1,1,1,4,4,4-hexafluorobut-2-ene is totally or partially replaced with (Z)-1,1,1,4,4,4-hexafluorobut-2-ene.

DESCRIPTION OF EMBODIMENTS OF THE INVENTION

The invention is now described in greater detail and in a nonlimiting manner in the description which follows.

The compounds used in the context of the invention are denoted as follows:

(E)-1,1,1,4,4,4-hexafluorobut-2-ene: HFO-E-1336mzz;
1,3,3,3-tetrafluoropropene: HFO-1234ze;
2,3,3,3-tetrafluoropropene: HFO-1234yf;
3,3,3-trifluoropropene: HFO-1243zf;
1,1,1,2-tetrafluoroethane: HFC-134a;
1,1-difluoroethane: HFC-152a;
difluoromethane: HFC-32;
pentafluoroethane: HFC-125;
propane: HC-290;
isobutane: HC-600a;
dimethyl ether: DME.

Unless otherwise mentioned, throughout the application, the proportions of compounds indicated are given as percentages by weight.

The HFC-1234ze can be cis or trans form or be a mixture of these two forms. It is preferably in trans (E) form.

According to the present application, the global warming potential (GWP) is defined with respect to carbon dioxide and with respect to a period of 100 years, according to the method indicated in "The scientific assessment of ozone depletion, 2002, a report of the World Meteorological Association's Global Ozone Research and Monitoring Project".

The term "heat-transfer compound", respectively "heat-transfer fluid" (or refrigerant) is intended to mean a compound, respectively a fluid, capable of absorbing heat by evaporating at low temperature and low pressure and of releasing heat by condensing at high temperature and high pressure, in a vapor compression circuit. In general, a heat-transfer fluid can comprise one, two, three or more than three heat-transfer compounds.

The term "heat-transfer composition" is intended to mean a composition comprising a heat-transfer fluid and, optionally, one or more additives which are not heat-transfer compounds for the intended application.

The additives can in particular be chosen from lubricants, stabilizers, surfactants, tracers, fluorescent agents, odorous agents and solubilizing agents.

The stabilizer(s), when they are present, preferably represent at most 5% by weight in the heat-transfer composition. Among the stabilizers, mention may in particular be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (optionally fluorinated or perfluorinated alkyl or alkenyl or aromatic) such as n-butyl glycidyl ether, hexanediol diglycidyl ether, allyl glycidyl ether, butylphenyl glycidyl ether, phosphites, phosphonates, thiols and lactones.

As lubricants, use may in particular be made of oils of mineral origin, silicone oils, paraffins of natural origin, naphthenes, synthetic paraffins, alkylbenzenes, poly-alpha-olefins, polyalkene glycols, polyol esters and/or polyvinyl ethers.

As tracers (capable of being detected), mention may be made of deuterated or nondeuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer is different than the heat-transfer compound(s) of which the heat-transfer fluid is composed.

As solubilizing agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different than the heat-transfer compound(s) of which the heat-transfer fluid is composed.

As fluorescent agents, mention may be made of naphthalimides, perylenes, coumarins, anthracenes, phenanthracenes, xanthenes, thioxanthenes, naphthoxanthenes, fluoresceins and derivatives and combinations thereof.

As odorous agents, mention may be made of alkyl acrylates, allyl acrylates, acrylic acids, acryl esters, alkyl ethers, alkyl esters, alkynes, aldehydes, thiols, thioethers, disulfides, allylisothiocyanates, alkanoic acids, amines, norbornenes, norbornene derivatives, cyclohexene, heterocyclic aromatic compounds, ascaridole, o-methoxy(methyl)phenol and combinations thereof.

The heat-transfer process according to the invention is based on the use of equipment comprising a vapor compression circuit which contains a heat-transfer fluid. The heat-transfer process can be a process for heating or for cooling a fluid or a body.

The vapor compression circuit containing a heat-transfer fluid comprises at least one evaporator, one compressor, one condenser and one pressure-reducing valve, and also lines for transporting the heat-transfer fluid between these elements. The evaporator and the condenser comprise a heat exchanger that allows an exchange of heat between the heat-transfer fluid and another fluid or body.

As a compressor, use may in particular be made of a centrifugal compressor with one or more stages or a centrifugal mini compressor. Rotary compressors, reciprocating compressors or screw compressors can also be used. The compressor may be driven by an electric motor or by a gas turbine (for example fed with the exhaust gases of a vehicle, for mobile applications) or by gearing.

The equipment may comprise a turbine for generating electricity (Rankine cycle).

The equipment can also optionally comprise at least one heat-exchange fluid circuit used for transmitting heat (with or without a change of state) between the heat-transfer fluid circuit and the fluid or body to be heated or cooled.

The equipment may also optionally comprise two (or more) vapor compression circuits containing identical or distinct heat-transfer fluids. For example, the vapor compression circuits may be coupled together.

The vapor compression circuit operates according to a conventional vapor compression cycle. The cycle comprises the change of state of the heat-transfer fluid from a liquid phase (or liquidivapor two phase state) to a vapor phase at a relatively low pressure, then the compression of the fluid in the vapor phase up to a relatively high pressure, the change of state (condensation) of the heat-transfer fluid of the vapor phase to the liquid phase at a relatively high pressure, and the reduction of the pressure in order to recommence the cycle.

In the case of a cooling process, heat from the fluid or from the body that is being cooled (directly or indirectly, via a heat-exchange fluid) is absorbed by the heat-transfer fluid, during the evaporation of the latter, at a relatively low temperature compared with the surroundings. The cooling processes include air conditioning processes (with mobile equipment, for example in vehicles, or stationary equipment), refrigeration processes and freezing processes or cryogenic processes.

In the case of a heating process, heat is imparted (directly or indirectly, via a heat-exchange fluid) from the heat-transfer fluid, during the condensation thereof, to the fluid or the body that is being heated, at a relatively high temperature compared with the surroundings. The equipment that makes it possible to implement the heat transfer is called, in this case, a "heat pump".

It is possible to employ any type of heat exchanger for using the heat-transfer fluids according to the invention, and in particular concurrent heat exchangers or, preferably, countercurrent heat exchangers.

The heat-transfer fluids used in the context of the present invention are compositions which comprise HFO-E-1336mzz in combination with at least one hydrocarbon, ether, hydrofluoroether, hydrofluorocarbon or fluoroolefin compound (preferably a hydrofluorocarbon or fluoroolefin compound) with a boiling point less than or equal to -12° C. at a pressure of 101.325 kPa.

The boiling point can be measured according to standard NF EN 378-1 of April 2008.

HC-600a has a boiling point greater than –12° C. and is not therefore involved.

Preferably, the compound is chosen from HFO-1234yf, HFO-1234ze, HFO-1243zf, HFC-134a, HFC-32, HFC-152a, HFC-125, DME and HC-290.

In particular, the compositions above can be binary or ternary mixtures of compounds. In the case of the ternary mixtures, the heat-transfer fluid can comprise HFO-E-1336mzz in combination with two compounds chosen from HFO-1234yf, HFO-1234ze, HFO-1243zf, HFC-134a, HFC-32, HFC-152a, HFC-125, DME and HC-290; or else HFO-E-1336mzz in combination with a compound chosen from HFO-1234yf, HFO-1234ze, HFO-1243zf, HFC-134a, HFC-32, HFC-152a, HFC-125, DME and HC-290 and also an additional compound, preferably chosen from hydrocarbons, hydrochlorofluorocarbons, hydrofluorocarbons, fluoroethers, hydrocarbon ethers, ammonia and carbon dioxide, and more particularly preferably HC-600a.

According to one embodiment, the compositions above contain no HC-600a, optionally no HC-290, and optionally no hydrocarbon.

According to one embodiment, the compositions above comprise only fluoroolefins and/or hydrofluorocarbons.

Among the compositions above, some have the advantage of being azeotrope-like.

The term "azentrope-like" denotes compositions for which, at constant temperature, the liquid saturation pressure and the vapor saturation pressure are virtually identical (the maximum pressure difference being 10%, or even advantageously 5%, relative to the liquid saturation pressure). These heat-transfer fluids have an advantage in that they are easy to use. In the absence of any significant temperature glide, there is no significant change in the circulating composition, and no significant change either in the composition in the event of a leak.

In particular, the binary or ternary mixtures which have the following compositions are azeotrope-like at a reference temperature of –5° C.:
  from 1% to 8% of HFO-E-1336mzz and from 92% to 99% of HFO-1234yf;
  from 1% to 12% of HFO-E-1336mzz and from 88% to 99% of HFO-1234ze; or
  from 1% to 9% of HFO-E-1336mzz and from 91% to 99% of HFC-134a; or
  from 1% to 6% of HFO-E-1336mzz and from 94% to 99% of HFC-32; or
  from 1% to 17% of HFO-E-1336mzz and from 83% to 99% of HFC-152a; or
  from 1% to 26% of HFO-E-1336mzz and from 74% to 99% of HC-290; or
  from 1% to 10% of HFO-E-1336mzz and from 90% to 99% of FIFO-1243zf; or
  from 1% to 10% of HFO-E-1336mzz, from 1% to 98% of HFC-134a and from 1% to 98% of HFO-1234ze; or
  from 1% to 8% of HFO-E-1336mzz, from 1% to 98% of HFC-134a and from 1% to 98% of HFO-1234yf; or
  from 1% to 15% of HFO-E-1336mzz, from 1% to 98% of HFC-134a and from 1% to 98% of HFC-152a; or
  from 1% to 8% of HFO-E-1336mzz, from 1% to 98% of HFO-1234yf and from 1% to 98% of HFO-1243zf; or
  from 1% to 8% of HFO-E-1336mzz, from 1% to 98% of HFC-134a and from 1% to 98% of HFO-1243zf; or from 1% to 8% of HFO-E-1336mzz, from 1% to 98% of HFO-1234yf and from 1% to 98% of HFO-1234ze; or from 1% to 20% of HFO-E-1336mzz, from 1% to 30% of HFC-134a and from 50% to 98% of HC-290; or from 1% to 20% of HFO-E-1336mzz, from 1% to 98% of HFO-1234yf and from 1% to 98% of HC-290; or from 1% to 13% of HFO-E-1336mzz, from 1% to 98% of HFO-1234yf and from 1% to 98% of HFC-152a; or from 1% to 15% of HFO-E-1336mzz, from 1% to 98% of HFO-1234ze and from 1% to 98% of HFC-152a; or from 1% to 20% of HFO-E-1336mzz, from 1% to 98% of HFO-1234ze and from 1% to 98% of NC-290.

In addition it has been found that certain compositions according to the invention have improved performance levels compared with HFO-1234ze, and which are close to those of HC-600a, in particular for processes for cooling or for heating at moderate temperature, i.e. those in which the temperature of the fluid or of the body cooled is from −15° C. to 15° C., preferably from −10° C. to 10° C. and more particularly preferably from −5° C. to 5° C. (ideally approximately 0° C.). These compositions are in particular the following binary or ternary mixtures:

from 10% to 50% of HFO-E-1336mzz and from 50% to 90% of HFO-1234ze (in particular from 30% to 40% of HFO-E-1336mzz and from 60% to 70% of HFO-1234ze);

from 55% to 95% of HFO-E-1336mzz and from 5% to 45% of HFC-134a;

from 1% to 98% of HFO-E-1336mzz, from 1% to 98% of HFO-1234ze and from 1% to 40% of HFC-134a, preferably 2% to 40% of HFO-E-1336mzz, from 20% to 93% of HFO-1234ze and from 5% to 40% of HFC-134a and more particularly preferably from 2% to 35% of HFO-E-1336mzz, from 33% to 89% of HFO-1234ze and from 9% to 32% of HFC-134a;

from 1% to 98% of HFO-E-1336mzz, from 1% to 98% of HFO-1234yf and from 1% to 50% of HFC-134a, preferably from 2% to 60% of HFO-E-1336mzz, from 2% to 93% of HFO-1234yf and from 5% to 50% of HFC-134a and particularly preferably from 5% to 45% of HFO-E-1336mzz, from 11% to 86% of HFO-1234yf and from 9% to 44% of HFC-134a.

In the processes for "cooling or heating at moderate temperature" mentioned above, the inlet temperature of the heat-transfer fluid at the evaporator is preferably from −20° C. to 10° C., in particular from −15° C. to 5° C., more particularly preferably from −10° C. to 0° C. and for example approximately −5° C.; and the temperature at the beginning of the condensation of the heat-transfer fluid at the condenser is preferably from 25° C. to 90° C., in particular from 30° C. to 70° C., more particularly preferably from 35° C. to 55° C. and for example approximately 50° C. These processes can be refrigeration processes, air conditioning processes or heating processes.

The compositions according to the invention can also be of use as a blowing agent, an aerosol or a solvent.

EXAMPLES

The following examples illustrate the invention without limiting it.

Example 1

Method for Calculating the Properties of the Heat-transfer fluids in the Various Configurations Envisaged The RK-Soave equation is used to calculate the densities, enthalpies, entropies and liquid/vapor equilibrium data of the mixtures. The use of this equation requires knowledge of the properties of the pure substances used in the mixtures in question and also the interaction coefficients for each binary mixture.

The data available for each pure substance are the boiling point, the critical temperature and the critical pressure, the curve of pressure as a function of the temperature from the boiling point up to the critical point, and the saturated liquid and saturated vapor densities as a function of the temperature.

The data regarding HFCs are published in the Ashrae Handbook 2005, chapter 20, and are also available from Refrop (software developed by NIST for calculating the properties of refrigerants).

The HFO temperature-pressure curve data are measured by the static method. The critical temperature and the critical pressure are measured using a C80 calorimeter sold by Setaram.

The RK-Soave equation uses coefficients of binary interaction to represent the behavior of products in mixtures. The coefficients are calculated as a function of the experimental liquid/vapor equilibrium data.

The technique used for the liquid/vapor equilibrium measurements is the static analytical cell method. The equilibrium cell comprises a sapphire tube and is equipped with two Rolsitm electromagnetic samplers. It is immersed in a cryo-thermostat bath (Huber HS40). Magnetic stirring driven by a magnetic field rotating at a variable speed is used to accelerate the reaching of the equilibria. The sample analysis is carried out by gas chromatography (HP5890 series II) using a catharometer (TCD).

The liquid/vapor equilibrium measurements on the binary mixture HFC-134a/HFO-1234ze are carried out for the following isotherm: 20° C.

The liquid/vapor equilibrium measurements on the binary mixture HFC-134a/HFO-1234yf are carried out for the following isotherm: 20° C.

The liquid/vapor equilibrium data for the binary mixture HFO-1243zf/HFO-1234yf are produced for the following isotherm: 21° C.

The liquid/vapor equilibrium measurements on the binary mixture HFC-134a/HFO-1243zf are carried out for the following isotherm: 10° C.

The liquid/vapor equilibrium measurements on the binary mixture HFO-1234ze/HFO-1234yf are carried out for the following isotherm: 18° C.

The liquid/vapor equilibrium measurements on the binary mixture HC-290/HFO-1234yf are carried out for the following isotherm: -10 and 55° C.

The liquid/vapor equilibrium measurements on the binary mixture HFC-152a/HFO-1234yf are carried out for the following isotherm: 10° C.

The liquid/vapor equilibrium measurements on the binary mixture HFC-152a/HFO-1234ze are carried out for the following isotherm: 15° C.

The liquid/vapor equilibrium measurements on the binary mixture HFC-134a / HFO-E-1336mzz are carried out for the following isotherm: 45° C.

The liquid/vapor equilibrium measurements on the binary mixture HFC-32/HFO-E-1336mzz are carried out for the following isotherm: 45° C.

The liquid/vapor equilibrium measurements on the binary mixture HFC-152a/HFO-E-1336mzz are carried out for the following isotherm: 45° C.

The liquid/vapor equilibrium measurements on the binary mixture HC-290/HFO-E-1336mzz are carried out for the following isotherm: 45° C.

The liquid/vapor equilibrium measurements on the binary mixture HFO-1234yf/HFO-E-1336mzz are carried out for the following isotherm: 45° C.

The liquid/vapor equilibrium measurements on the binary mixture HFO-1243zUHFO-E-1336mzz are carried out for the following isotherm: 45° C.

The liquid/vapor equilibrium measurements on the binary mixture HFO-1234ze/HFO-E-1336mzz are carried out for the following isotherm: 45° C.

For the evaluation of the energy performance levels, a compression system equipped with a countercurrent evaporator and condenser, with a screw compressor and with a pressure-reducing valve is considered.

The system operates with 5°C of overheat. The evaporation temperature is −5° C. and the condensation temperature is 50° C.

The coefficient of performance (COP) is defined as being the useful power supplied by the system over the power provided or consumed by the system.

The Lorenz coefficient of performance (COPLorenz) is a reference coefficient of performance. It depends on temperatures and is used to compare the COPs of the various fluids.

The Lorenz coefficient of performance is defined as follows (the temperatures T are in K):

$$T_{average}^{condenser} = T_{inlet}^{condenser} - T_{outlet}^{condenser}$$
$$T_{average}^{evaporator} = T_{outlet}^{evaporator} - T_{inlet}^{evaporator}$$

The Lorenz COP in the case of conditioned air and of refrigeration is:

$$COPlorenz = \frac{T_{average}^{evaporator}}{T_{average}^{condenser} - T_{average}^{evaporator}}$$

The Lorenz COP in the case of heating is:

$$COPlorenz = \frac{T_{average}^{condenser}}{T_{average}^{condenser} - T_{average}^{evaporator}}$$

For each composition, the coefficient of performance of the Lorenz cycle is calculated as a function of the corresponding temperatures.

In the tables which follow, "Temp (° C.)" denotes the temperature, "P sat liquid" denotes the liquid saturation pressure, "P sat vapor" denotes the vapor saturation pressure, "Diff Pressure (%)" denotes the ratio of the difference between the liquid saturation pressure and the vapor saturation pressure, over the liquid saturation pressure (as %), "Temp evap outlet" denotes the temperature of the fluid at the outlet of the evaporator, "Temp comp outlet" denotes the temperature of the fluid at the outlet of the compressor, "T cond outlet" denotes the temperature of the fluid at the outlet of the condenser, "Temp press-red inlet" denotes the temperature of the fluid at the inlet of the pressure-reducing valve, "evap P (bar)" denotes the pressure of the fluid in the evaporator, "cond P (bar)" denotes the pressure of the fluid in the condenser, "Ratio (w/w)" denotes the compression ratio, "Glide" denotes the temperature glide, "% CAP" denotes the volumetric capacity of the fluid relative to the reference fluid indicated on the first line, "% COP/COPLorenz" denotes the ratio of the COP of the system relative to the COP of the corresponding Lorenz cycle.

Example 2

Data for the Azeotrope-like Mixtures

HFO-1234yf/HFO-E-1336mzz mixture:

| Composition (%) | | Temp. (° C.) | P sat. liquid | P sat. vapor | Diff. pressure (%) |
|---|---|---|---|---|---|
| HFO-1234yf | HFO-E-1336mzz | | | | |
| 98 | 2 | −5 | 2.6 | 2.5 | 3 |
| 96 | 4 | −5 | 2.6 | 2.4 | 6 |
| 94 | 6 | −5 | 2.5 | 2.3 | 8 |
| 93 | 7 | −5 | 2.5 | 2.3 | 9 |

| Composition (%) | | Temp. (° C.) | P sat. liquid | P sat. vapor | Diff. pressure (%) |
|---|---|---|---|---|---|
| HFO-1234ze | HFO-E-1336mzz | | | | |
| 96 | 4 | −5 | 1.7 | 1.7 | 4 |
| 95 | 5 | −5 | 1.7 | 1.7 | 4 |
| 91 | 9 | −5 | 1.7 | 1.6 | 8 |
| 90 | 10 | −5 | 1.7 | 1.5 | 8 |
| 89 | 11 | −5 | 1.7 | 1.5 | 9 |
| 88 | 12 | −5 | 1.7 | 1.5 | 10 |

HFC-134a/HFOE-1336mz mixture:

| Composition (%) | | Temp. (° C.) | P sat. liquid | P sat. vapor | Diff. pressure (%) |
|---|---|---|---|---|---|
| HFC-134a | HFO-E-1336mzz | | | | |
| 96 | 4 | −5 | 2.4 | 2.3 | 4 |
| 95 | 5 | −5 | 2.4 | 2.2 | 5 |
| 91 | 9 | −5 | 2.3 | 2.1 | 10 |

HFC-32/HFO-E-1336mz mixture:

| Composition (%) | | Temp. (° C.) | P sat. liquid | P sat. vapor | Diff. pressure (%) |
|---|---|---|---|---|---|
| HFC-32 | HFO-E-1336mzz | | | | |
| 99 | 1 | −5 | 6.9 | 6.8 | 2 |
| 98 | 2 | −5 | 6.9 | 6.6 | 3 |
| 96 | 4 | −5 | 6.8 | 6.3 | 7 |
| 95 | 5 | −5 | 6.8 | 6.2 | 9 |

HFC-152a/HFO-E-1336mzz mixture:

| Composition (%) | | Temp. (° C.) | P sat. liquid | P sat. vapor | Diff. pressure (%) |
|---|---|---|---|---|---|
| HFC-152a | HFO-E-1336mzz | | | | |
| 98 | 2 | −5 | 2.2 | 2.2 | 1 |
| 96 | 4 | −5 | 2.2 | 2.1 | 2 |
| 94 | 6 | −5 | 2.2 | 2.1 | 4 |
| 92 | 8 | −5 | 2.1 | 2.0 | 5 |
| 90 | 10 | −5 | 2.1 | 2.0 | 6 |
| 88 | 12 | −5 | 2.1 | 2.0 | 7 |
| 86 | 14 | −5 | 2.1 | 1.9 | 8 |
| 84 | 16 | −5 | 2.1 | 1.9 | 9 |

HC-290/HFO-E-1336mzz mixture:

| Composition (%) | | Temp. (° C.) | P sat. liquid | P sat. vapor | Diff. pressure (%) |
|---|---|---|---|---|---|
| HC-290 | HFO-E-1336mzz | | | | |
| 98 | 2 | −5 | 4.0 | 4.0 | 0 |
| 96 | 4 | −5 | 4.0 | 4.0 | 0 |
| 94 | 6 | −5 | 4.0 | 4.0 | 1 |
| 92 | 8 | −5 | 4.0 | 4.0 | 1 |
| 90 | 10 | −5 | 4.0 | 4.0 | 1 |
| 85 | 15 | −5 | 4.0 | 3.9 | 3 |
| 80 | 20 | −5 | 3.9 | 3.7 | 5 |
| 75 | 25 | −5 | 3.9 | 3.6 | 9 |

HFO-1243zf/HFO-E-1336mzz mixture:

| Composition (%) | | Temp. (° C.) | P sat. liquid | P sat. vapor | Diff. pressure (%) |
|---|---|---|---|---|---|
| HFO-1243zf | HFO-E-1336mzz | | | | |
| 98 | 2 | −5 | 2.3 | 2.2 | 2 |
| 96 | 4 | −5 | 2.2 | 2.1 | 4 |
| 94 | 6 | −5 | 2.2 | 2.1 | 6 |
| 93 | 7 | −5 | 2.2 | 2.1 | 7 |
| 92 | 8 | −5 | 2.2 | 2.0 | 8 |
| 90 | 10 | −5 | 2.2 | 2.0 | 10 |

HFC-134a/HFO-1234ze/HFO-E-1336mzz mixture:

| Composition (%) | | | Temp. (° C.) | P sat. liquid | P sat. vapor | Diff. pressure (%) |
|---|---|---|---|---|---|---|
| HFC-134a | HFO-1234ze | HFO-E-1336mzz | | | | |
| 3 | 90 | 7 | −5 | 1.7 | 1.6 | 7 |
| 10 | 83 | 7 | −5 | 1.8 | 1.7 | 8 |
| 20 | 73 | 7 | −5 | 1.9 | 1.7 | 9 |
| 30 | 63 | 7 | −5 | 2.0 | 1.8 | 10 |
| 40 | 53 | 7 | −5 | 2.1 | 1.9 | 10 |
| 50 | 43 | 7 | −5 | 2.1 | 1.9 | 10 |
| 3 | 89 | 8 | −5 | 1.7 | 1.6 | 8 |
| 10 | 82 | 8 | −5 | 1.8 | 1.6 | 9 |
| 20 | 72 | 8 | −5 | 1.9 | 1.7 | 10 |
| 3 | 88 | 9 | −5 | 1.7 | 1.6 | 8 |
| 10 | 81 | 9 | −5 | 1.8 | 1.6 | 10 |
| 3 | 87 | 10 | −5 | 1.7 | 1.6 | 9 |

HFC-134a/HFO-1234yf/HFO-E-1336mzz mixture:

| Composition (%) | | | Temp. (° C.) | P sat. liquid | P sat. vapor | Diff. pressure (%) |
|---|---|---|---|---|---|---|
| HFC-134a | HFO-1234yf | HFO-E-1336mzz | | | | |
| 2 | 93 | 5 | −5 | 2.6 | 2.4 | 7 |
| 10 | 85 | 5 | −5 | 2.6 | 2.4 | 8 |
| 15 | 80 | 5 | −5 | 2.6 | 2.4 | 8 |
| 20 | 75 | 5 | −5 | 2.6 | 2.4 | 8 |
| 25 | 70 | 5 | −5 | 2.6 | 2.4 | 8 |
| 30 | 65 | 5 | −5 | 2.6 | 2.4 | 8 |
| 40 | 55 | 5 | −5 | 2.6 | 2.4 | 8 |
| 50 | 45 | 5 | −5 | 2.6 | 2.4 | 8 |
| 60 | 35 | 5 | −5 | 2.6 | 2.4 | 8 |
| 70 | 25 | 5 | −5 | 2.5 | 2.4 | 8 |
| 80 | 15 | 5 | −5 | 2.5 | 2.3 | 7 |
| 90 | 5 | 5 | −5 | 2.4 | 2.3 | 6 |
| 5 | 89 | 6 | −5 | 2.6 | 2.3 | 9 |
| 10 | 84 | 6 | −5 | 2.6 | 2.4 | 9 |
| 20 | 74 | 6 | −5 | 2.6 | 2.4 | 9 |
| 30 | 64 | 6 | −5 | 2.6 | 2.4 | 9 |
| 40 | 54 | 6 | −5 | 2.6 | 2.4 | 9 |
| 50 | 44 | 6 | −5 | 2.6 | 2.4 | 9 |
| 60 | 34 | 6 | −5 | 2.6 | 2.3 | 9 |
| 70 | 24 | 6 | −5 | 2.5 | 2.3 | 9 |
| 80 | 14 | 6 | −5 | 2.5 | 2.3 | 8 |
| 90 | 4 | 6 | −5 | 2.4 | 2.2 | 7 |
| 5 | 88 | 7 | −5 | 2.6 | 2.3 | 10 |
| 10 | 83 | 7 | −5 | 2.6 | 2.3 | 10 |
| 60 | 33 | 7 | −5 | 2.6 | 2.3 | 10 |
| 70 | 23 | 7 | −5 | 2.5 | 2.3 | 10 |
| 80 | 13 | 7 | −5 | 2.5 | 2.2 | 9 |
| 90 | 3 | 7 | −5 | 2.4 | 2.2 | 8 |

HFC-134a/HFC-152a/HFO-E-1336mzz mixture:

| Composition (%) | | | Temp. (° C.) | P sat. liquid | P sat. vapor | Diff. pressure (%) |
|---|---|---|---|---|---|---|
| HFC-134a | HFC-152a | HFO-E-1336mzz | | | | |
| 5 | 87 | 8 | −5 | 2.1 | 2.0 | 5 |
| 10 | 82 | 8 | −5 | 2.1 | 2.0 | 5 |
| 20 | 72 | 8 | −5 | 2.1 | 2.0 | 5 |
| 30 | 62 | 8 | −5 | 2.2 | 2.0 | 5 |
| 50 | 42 | 8 | −5 | 2.2 | 2.1 | 6 |
| 70 | 22 | 8 | −5 | 2.2 | 2.1 | 6 |
| 90 | 2 | 8 | −5 | 2.3 | 2.1 | 8 |
| 5 | 83 | 12 | −5 | 2.1 | 2.0 | 7 |
| 10 | 78 | 12 | −5 | 2.1 | 2.0 | 7 |
| 20 | 68 | 12 | −5 | 2.1 | 2.0 | 7 |
| 30 | 58 | 12 | −5 | 2.1 | 2.0 | 8 |
| 60 | 28 | 12 | −5 | 2.2 | 2.0 | 9 |
| 5 | 80 | 15 | −5 | 2.1 | 1.9 | 9 |
| 10 | 75 | 15 | −5 | 2.1 | 1.9 | 9 |
| 20 | 65 | 15 | −5 | 2.1 | 1.9 | 9 |
| 30 | 55 | 15 | −5 | 2.1 | 1.9 | 10 |
| 40 | 45 | 15 | −5 | 2.1 | 1.9 | 10 |

HFC-134a/HFO-1243zf/HFO-E-1336mzz mixture:

| Composition (%) | | | Temp. (° C.) | P sat. liquid | P sat. vapor | Diff. pressure (%) |
|---|---|---|---|---|---|---|
| HFC-134a | HFO-1243zf | HFO-E-1336mzz | | | | |
| 5 | 87 | 8 | −5 | 2.2 | 2.0 | 8 |
| 10 | 82 | 8 | −5 | 2.2 | 2.0 | 8 |
| 20 | 72 | 8 | −5 | 2.3 | 2.1 | 8 |
| 30 | 62 | 8 | −5 | 2.3 | 2.1 | 9 |
| 40 | 52 | 8 | −5 | 2.3 | 2.1 | 9 |
| 50 | 42 | 8 | −5 | 2.3 | 2.1 | 9 |
| 60 | 32 | 8 | −5 | 2.3 | 2.1 | 9 |
| 70 | 22 | 8 | −5 | 2.3 | 2.1 | 9 |
| 80 | 12 | 8 | −5 | 2.3 | 2.1 | 9 |
| 90 | 2 | 8 | −5 | 2.3 | 2.1 | 9 |

HFC-134a/HC-290/HFO-E-1336mzz mixture:

| Composition (%) | | | Temp. (° C.) | P sat. liquid | P sat. vapor | Diff. pressure (%) |
|---|---|---|---|---|---|---|
| HFC-134a | HC-290 | HFO-E-1336mzz | | | | |
| 5 | 86 | 9 | −5 | 4.2 | 4.0 | 3 |
| 10 | 81 | 9 | −5 | 4.3 | 4.1 | 5 |
| 20 | 71 | 9 | −5 | 4.5 | 4.2 | 7 |
| 5 | 80 | 15 | −5 | 4.1 | 3.9 | 5 |

-continued

| Composition (%) | | | Temp. | P sat. | P sat. | Diff. pressure |
|---|---|---|---|---|---|---|
| HFC-134a | HC-290 | HFO-E-1336mzz | (° C.) | liquid | vapor | (%) |
| 10 | 75 | 15 | −5 | 4.2 | 3.9 | 7 |
| 5 | 75 | 20 | −5 | 4.1 | 3.8 | 8 |

HFO-1234ze/HFO-E-1336mzz mixture,

| Composition (%) | | | Temp. | P sat. | P sat. | Diff. pressure |
|---|---|---|---|---|---|---|
| HFO-1234yf | HFO-1234ze | HFO-E-1336mzz | (° C.) | liquid | vapor | (%) |
| 5 | 90 | 5 | −5 | 1.8 | 1.7 | 6 |
| 15 | 80 | 5 | −5 | 1.9 | 1.8 | 8 |
| 25 | 70 | 5 | −5 | 2.0 | 1.8 | 9 |
| 35 | 60 | 5 | −5 | 2.1 | 1.9 | 10 |
| 10 | 82 | 8 | −5 | 1.8 | 1.6 | 10 |

HFC-1234/HC-290/HFO-E-1336mzz mixture:

| Composition (%) | | | Temp. | P sat. | P sat. | Diff. pressure |
|---|---|---|---|---|---|---|
| HFO-1234yf | HC-290 | HFO-E-1336mzz | (° C.) | liquid | vapor | (%) |
| 10 | 82 | 8 | −5 | 4.1 | 4.0 | 2 |
| 20 | 72 | 8 | −5 | 4.2 | 4.1 | 3 |
| 30 | 62 | 8 | −5 | 4.3 | 4.1 | 4 |
| 40 | 52 | 8 | −5 | 4.3 | 4.0 | 6 |
| 50 | 42 | 8 | −5 | 4.3 | 3.9 | 10 |
| 10 | 78 | 12 | −5 | 4.1 | 4.0 | 4 |
| 20 | 68 | 12 | −5 | 4.2 | 4.0 | 5 |
| 30 | 58 | 12 | −5 | 4.3 | 3.9 | 8 |
| 5 | 75 | 20 | −5 | 4.0 | 3.7 | 7 |
| 10 | 70 | 20 | −5 | 4.0 | 3.7 | 9 |

HFO-1234yf/HFO-1243zf/HFO-E-1336mzz mixture:

| Composition (%) | | | Temp. | P sat. | P sat. | Diff. pressure |
|---|---|---|---|---|---|---|
| HFO-1234yf | HFO-1243zf | HFO-E-1336mzz | (° C.) | liquid | vapor | (%) |
| 10 | 82 | 8 | −5 | 2.2 | 2.0 | 8 |
| 20 | 72 | 8 | −5 | 2.3 | 2.1 | 9 |
| 30 | 62 | 8 | −5 | 2.3 | 2.1 | 9 |
| 40 | 52 | 8 | −5 | 2.3 | 2.1 | 9 |
| 50 | 42 | 8 | −5 | 2.4 | 2.1 | 10 |
| 60 | 32 | 8 | −5 | 2.4 | 2.2 | 10 |
| 70 | 22 | 8 | −5 | 2.4 | 2.2 | 10 |
| 80 | 12 | 8 | −5 | 2.5 | 2.2 | 10 |

HC-290/HFO-1234ze/HFO-E-1336mzz mixture:

| Composition (%) | | | Temp. | P sat. | P sat. | Diff. pressure |
|---|---|---|---|---|---|---|
| HC-290 | HPO-1234ze | HFO-E-1336mzz | (° C.) | liquid | vapor | (%) |
| 70 | 20 | 10 | −5 | 3.8 | 3.4 | 9 |
| 80 | 10 | 10 | −5 | 3.9 | 3.7 | 5 |
| 85 | 5 | 10 | −5 | 4.0 | 3.8 | 3 |
| 75 | 5 | 20 | −5 | 3.9 | 3.6 | 8 |

HFO-1234yf/HFC-152a/HFO-E-1336mzz mixture:

| Composition (%) | | | Temp. | P sat. | P sat. | Diff. pressure |
|---|---|---|---|---|---|---|
| HFO-1234yf | HFC-152a | HFO-E-1336mzz | (° C.) | liquid | vapor | (%) |
| 90 | 5 | 5 | −5 | 3 | 2 | 7 |
| 60 | 35 | 5 | −5 | 3 | 2 | 7 |
| 50 | 45 | 5 | −5 | 3 | 2 | 7 |
| 40 | 55 | 5 | −5 | 2 | 2 | 7 |
| 20 | 75 | 5 | −5 | 2 | 2 | 6 |
| 10 | 85 | 5 | −5 | 2 | 2 | 5 |
| 30 | 60 | 10 | −5 | 2 | 2 | 10 |
| 20 | 70 | 10 | −5 | 2 | 2 | 9 |
| 10 | 80 | 10 | −5 | 2 | 2 | 8 |
| 7 | 80 | 13 | −5 | 2 | 2 | 9 |
| 2 | 85 | 13 | −5 | 2 | 2 | 8 |

HFO-1234ze/HFC-152a/HFO-E-1336mzz mixture:

| Composition (%) | | | Temp. | P sat. | P sat. | Diff. pressure |
|---|---|---|---|---|---|---|
| HFO-1234ze | HFC-152a | HFO-E-1336mzz | (° C.) | liquid | vapor | (%) |
| 90 | 5 | 5 | −5 | 1.8 | 1.7 | 5 |
| 70 | 25 | 5 | −5 | 2.0 | 1.8 | 6 |
| 50 | 45 | 5 | −5 | 2.0 | 1.9 | 5 |
| 30 | 65 | 5 | −5 | 2.1 | 2.0 | 4 |
| 10 | 85 | 5 | −5 | 2.2 | 2.1 | 3 |
| 85 | 5 | 10 | −5 | 1.7 | 1.6 | 9 |
| 75 | 15 | 10 | −5 | 1.8 | 1.7 | 10 |
| 65 | 25 | 10 | −5 | 1.9 | 1.7 | 10 |
| 40 | 50 | 10 | −5 | 2.0 | 1.9 | 8 |
| 30 | 60 | 10 | −5 | 2.1 | 1.9 | 8 |
| 20 | 70 | 10 | −5 | 2.1 | 1.9 | 7 |
| 10 | 80 | 10 | −5 | 2.1 | 2.0 | 7 |
| 15 | 70 | 15 | −5 | 2.1 | 1.9 | 10 |
| 5 | 80 | 15 | −5 | 2.1 | 1.9 | 9 |

Example 3

Results for a Refrigeration at Moderate Temperature, Comparison with HFO-1234ze

HFO-1234ze/HFO-E-1336mzz mixture:

| Composition (%) | | Temp evap. outlet (° C.) | Temp comp outlet (° C.) | T cond outlet (° C.) | Temp pressred inlet (° C.) | evap P (bar) | cond P (bar) | Ratio (w/w) | Glide | Comp efficiency | % CAP | % COP/COPLorenz |
|---|---|---|---|---|---|---|---|---|---|---|---|---|
| HFO-1234ze | | −5 | 63 | 50 | 47 | 1.8 | 10.0 | 5.6 | 0.00 | 74.8 | 100 | 53 |
| HFO-1234ze | HFO-E-1336mzz | | | | | | | | | | | |
| 95 | 5 | −4 | 62 | 49 | 47 | 1.7 | 9.6 | 5.6 | 0.94 | 75.1 | 99 | 53 |
| 85 | 15 | −3 | 61 | 48 | 45 | 1.6 | 8.8 | 5.5 | 2.43 | 75.4 | 95 | 54 |
| 75 | 25 | −2 | 60 | 47 | 44 | 1.5 | 8.1 | 5.5 | 3.49 | 75.5 | 90 | 55 |
| 65 | 35 | −1 | 59 | 46 | 43 | 1.3 | 7.4 | 5.5 | 4.16 | 75.4 | 85 | 55 |

HFC-134a/HFO-E-1336mzz mixture:

| Composition (%) | | Temp evap. outlet (° C.) | Temp comp outlet (° C.) | T cond outlet (° C.) | Temp press-red inlet (° C.) | evap P (bar) | cond P (bar) | Ratio (w/w) | Glide | Comp efficiency | % CAP | % COP/COPLorenz |
|---|---|---|---|---|---|---|---|---|---|---|---|---|
| HFC-134a | HFO-E-1336mzz | | | | | | | | | | | |
| | HFO-1234ze | −5 | 63 | 50 | 47 | 1.8 | 10.0 | 5.6 | 0.00 | 74.8 | 100 | 53 |
| 95 | 5 | −4 | 70 | 49 | 47 | 2.4 | 12.6 | 5.3 | 1.24 | 76.3 | 137 | 55 |
| 85 | 15 | −1 | 68 | 47 | 45 | 2.2 | 11.4 | 5.2 | 3.58 | 76.9 | 132 | 57 |
| 75 | 25 | 1 | 66 | 45 | 43 | 2.0 | 10.3 | 5.0 | 5.53 | 77.5 | 127 | 58 |
| 65 | 35 | 2 | 64 | 43 | 41 | 1.9 | 9.2 | 5.0 | 7.01 | 77.9 | 120 | 59 |
| 55 | 45 | 3 | 61 | 42 | 39 | 1.7 | 8.2 | 4.9 | 7.91 | 78.0 | 112 | 60 |
| 45 | 55 | 3 | 59 | 41 | 38 | 1.5 | 7.3 | 5.0 | 8.14 | 77.7 | 101 | 60 |
| 35 | 65 | 3 | 58 | 40 | 38 | 1.3 | 6.5 | 5.2 | 7.59 | 76.9 | 89 | 60 |
| 25 | 75 | 1 | 56 | 41 | 38 | 1.0 | 5.8 | 5.6 | 6.14 | 75.0 | 74 | 58 |

HFC-134a/HFO-1234ze/HFO-E-1336mzz mixture:

| Composition (%) | | | Temp evap. outlet (° C.) | Temp comp outlet (° C.) | T cond outlet (° C.) | Temp press-red inlet (° C.) | evap P (bar) | cond P (bar) | Ratio (w/w) | Glide | Comp efficiency | % CAP | % COP/COPLorenz |
|---|---|---|---|---|---|---|---|---|---|---|---|---|---|
| HFC-134a | HFO-1234ze | HFO-E-1336mzz | | | | | | | | | | | |
| | HFO-1234ze | | −5 | 63 | 50 | 47 | 1.8 | 10.0 | 5.6 | 0.00 | 74.8 | 100 | 53 |
| 10 | 70 | 20 | −1 | 61 | 46 | 44 | 1.6 | 8.7 | 5.4 | 3.51 | 76.0 | 99 | 55 |
| 10 | 65 | 25 | −1 | 61 | 46 | 43 | 1.6 | 8.4 | 5.4 | 4.05 | 76.0 | 97 | 56 |
| 10 | 60 | 30 | −1 | 60 | 45 | 43 | 1.5 | 8.0 | 5.4 | 4.50 | 76.1 | 94 | 56 |
| 10 | 55 | 35 | 0 | 60 | 45 | 42 | 1.4 | 7.7 | 5.4 | 4.86 | 76.0 | 92 | 56 |
| 15 | 70 | 15 | −2 | 62 | 47 | 44 | 1.7 | 9.3 | 5.4 | 3.06 | 76.0 | 104 | 55 |
| 15 | 65 | 20 | −1 | 62 | 46 | 44 | 1.7 | 8.9 | 5.4 | 3.71 | 76.1 | 101 | 55 |
| 15 | 60 | 25 | −1 | 61 | 46 | 43 | 1.6 | 8.5 | 5.3 | 4.29 | 76.3 | 100 | 56 |
| 15 | 55 | 30 | 0 | 60 | 45 | 42 | 1.5 | 8.2 | 5.3 | 4.77 | 76.3 | 97 | 56 |
| 20 | 70 | 10 | −3 | 63 | 48 | 45 | 1.8 | 9.9 | 5.4 | 2.40 | 75.9 | 108 | 55 |
| 20 | 65 | 15 | −2 | 63 | 47 | 44 | 1.8 | 9.4 | 5.4 | 3.21 | 76.2 | 106 | 55 |
| 20 | 60 | 20 | −1 | 62 | 46 | 44 | 1.7 | 9.1 | 5.3 | 3.90 | 76.3 | 104 | 56 |
| 20 | 55 | 25 | 0 | 62 | 45 | 43 | 1.6 | 8.7 | 5.3 | 4.51 | 76.5 | 103 | 56 |
| 30 | 65 | 5 | −3 | 65 | 48 | 46 | 2.0 | 10.7 | 5.4 | 1.59 | 75.8 | 114 | 54 |
| 30 | 60 | 10 | −2 | 64 | 47 | 45 | 1.9 | 10.2 | 5.4 | 2.59 | 76.1 | 113 | 55 |
| 30 | 55 | 15 | −2 | 63 | 47 | 44 | 1.8 | 9.8 | 5.3 | 3.45 | 76.4 | 111 | 56 |
| 40 | 55 | 5 | −3 | 65 | 48 | 46 | 2.0 | 11.0 | 5.4 | 1.65 | 75.9 | 118 | 55 |
| 40 | 50 | 10 | −2 | 65 | 47 | 45 | 2.0 | 10.5 | 5.3 | 2.70 | 76.3 | 117 | 55 |
| 40 | 45 | 15 | −1 | 64 | 47 | 44 | 1.9 | 10.1 | 5.3 | 3.61 | 76.6 | 116 | 56 |

HFC-134a/HFO-1234yf/HFO-E-1336mzz mixture:

| Composition (%) | | | Temp evap. outlet (° C.) | Temp comp outlet (° C.) | T cond outlet (° C.) | Temp press-red inlet (° C.) | evap P (bar) | cond P (bar) | Ratio (w/w) | Glide | Comp efficiency | % CAP | % COP/COPLorenz |
|---|---|---|---|---|---|---|---|---|---|---|---|---|---|
| HFO-1234yf | HFC-134a | HFO-E-1336mzz | | | | | | | | | | | |
| | HFO-1234ze | | −5 | 63 | 50 | 47 | 1.8 | 10.0 | 5.6 | 0.00 | 74.8 | 100 | 53 |
| 60 | 10 | 30 | 3 | 58 | 44 | 41 | 2.0 | 9.4 | 4.6 | 7.55 | 79.1 | 120 | 58 |
| 55 | 10 | 35 | 3 | 58 | 43 | 40 | 1.9 | 8.9 | 4.6 | 8.14 | 79.2 | 117 | 59 |
| 50 | 10 | 40 | 4 | 57 | 42 | 39 | 1.8 | 8.4 | 4.6 | 8.56 | 79.1 | 113 | 59 |
| 45 | 10 | 45 | 4 | 57 | 41 | 38 | 1.7 | 7.9 | 4.7 | 8.80 | 79.0 | 108 | 59 |
| 60 | 15 | 25 | 2 | 59 | 44 | 42 | 2.2 | 10.0 | 4.6 | 6.86 | 79.1 | 124 | 57 |
| 55 | 15 | 30 | 3 | 59 | 44 | 41 | 2.0 | 9.4 | 4.6 | 7.63 | 79.2 | 121 | 58 |
| 50 | 15 | 35 | 3 | 58 | 43 | 40 | 1.9 | 8.9 | 4.6 | 8.21 | 79.2 | 118 | 59 |
| 45 | 15 | 40 | 4 | 58 | 42 | 39 | 1.8 | 8.4 | 4.6 | 8.62 | 79.1 | 114 | 59 |
| 55 | 20 | 25 | 2 | 60 | 44 | 42 | 2.2 | 10.0 | 4.6 | 6.91 | 79.1 | 126 | 57 |
| 50 | 20 | 30 | 3 | 59 | 43 | 41 | 2.1 | 9.5 | 4.6 | 7.67 | 79.1 | 123 | 58 |
| 45 | 20 | 35 | 3 | 59 | 43 | 40 | 1.9 | 9.0 | 4.6 | 8.25 | 79.2 | 119 | 59 |
| 40 | 20 | 40 | 4 | 58 | 42 | 39 | 1.8 | 8.5 | 4.6 | 8.65 | 79.1 | 115 | 59 |
| 60 | 30 | 10 | −1 | 62 | 48 | 45 | 2.5 | 11.9 | 4.8 | 3.53 | 78.6 | 134 | 55 |
| 55 | 30 | 15 | 0 | 61 | 46 | 44 | 2.4 | 11.3 | 4.7 | 4.87 | 78.8 | 132 | 56 |
| 50 | 30 | 20 | 1 | 61 | 45 | 43 | 2.3 | 10.7 | 4.7 | 5.98 | 78.9 | 130 | 57 |

| | | | | | | | | | | | | |
|---|---|---|---|---|---|---|---|---|---|---|---|---|
| 45 | 30 | 25 | 2 | 61 | 44 | 42 | 2.2 | 10.1 | 4.7 | 6.90 | 79.0 | 127 | 58 |
| 55 | 40 | 5 | −3 | 63 | 49 | 46 | 2.6 | 12.7 | 4.9 | 1.93 | 78.2 | 136 | 54 |
| 50 | 40 | 10 | −2 | 63 | 48 | 45 | 2.5 | 12.0 | 4.8 | 3.49 | 78.4 | 135 | 55 |
| 45 | 40 | 15 | 0 | 62 | 47 | 44 | 2.4 | 11.4 | 4.8 | 4.80 | 78.6 | 133 | 56 |

The invention claimed is:

1. A composition comprising (E)-1,1,1,4,4,4-hexafluorobut-2-ene with at least one compound having a boiling point less than or equal to −12° C. at a pressure of 101.325 KPa selected from the group consisting of 1,3,3,3-tetrafluoropropene, 2,3,3,3-tetrafluoropropene, 3,3,3-trifluoropropene, 1,1,1,2-tetrafluoroethane, 1,1-difluoroethane, difluoromethane, pentafluoroethane, propane and dimethyl ether, and mixtures thereof, wherein the difference between the liquid saturation pressure and the vapor saturation pressure at a temperature of −5° C. is less than or equal to 10% of the liquid saturation pressure.

2. The composition as claimed in claim 1, consisting of a mixture of:
(E)-1,1,1,4,4,4-hexafluorobut-2-ene and a compound selected from the group consisting of 1,3,3,3-tetrafluoropropene, 2,3,3,3-tetrafluoropropene, 3,3,3-trifluoropropene, 1,1,1,2-tetrafluoroethane, 1,1-difluoroethane, difluoromethane, pentafluoroethane and propane and mixtures thereof.

3. The composition as claimed in claim 1, comprising: from 10 to 50 weight % of (E)-1,1,1,4,4,4-hexafluorobut-2-ene and from 50 to 90 weight % of 1,3,3,3-tetrafluoropropene.

4. A heat-transfer composition comprising the composition as claimed in claim 1 further comprising one or more additives selected from the group consisting of lubricants, stabilizers, surfactants, tracers, fluorescent agents, odorous agents and solubilizing agents, and mixtures thereof.

5. Heat-transfer equipment comprising a vapor compression circuit containing a composition as claimed in claim 1.

6. The heat-transfer equipment as claimed in claim 5, selected from mobile heat-pump heating, or stationary heat-pump heating, air conditioning, refrigeration equipment, and freezing equipment and Rankine cycles.

7. A process for heating or cooling a fluid or a body by means of a vapor compression circuit containing a heat-transfer fluid, said process successively comprising evaporation of the heat-transfer fluid, compression of the heat-transfer fluid, condensation of the heat-transfer fluid and expansion of the heat-transfer fluid, wherein the heat-transfer fluid is a composition as claimed in claim 1.

8. The process as claimed in claim 7, comprising a process for cooling a fluid or a body, wherein the temperature of the fluid or of the body cooled is from −15° C. to 15° C.

9. A process for reducing the environmental impact of heat-transfer equipment comprising a vapor compression circuit containing an initial heat-transfer fluid, said process comprising a step replacing the initial heat-transfer fluid in the vapor compression circuit with a final heat-transfer fluid, the final heat-transfer fluid having a GWP which is lower than the initial heat-transfer fluid, wherein the final heat-transfer fluid is a composition as claimed in claim 1.

10. A composition consisting of a mixture of (E)-1,1,1,4,4,4-hexafluorobut-2-ene and two compounds selected from the group consisting of 1,3,3,3-tetrafluoropropene, 2,3,3,3-tetrafluoropropene, 3,3,3-trifluoropropene, 1,1,1,2-tetrafluoroethane, 1,1-difluoroethane, difluoromethane, pentafluoroethane, propane and isobutane, wherein the difference between the liquid saturation pressure and the vapor saturation pressure at a temperature of −5° C. is less than or equal to 10% of the liquid saturation pressure.

11. The composition as claimed in claim 1, comprising from 1% to 98% of (E)-1,1,1,4,4,4-hexafluorobut-2-ene, from 1% to 98% of 2,3,3,3-tetrafluoropropene and from 1% to 50% of 1,1,1,2-tetrafluoroethane.

12. The composition as claimed in claim 1, comprising from 1% to 98% of (E)-1,1,1,44,4-hexafluorobut-2-ene, from 1% to 98% of 1,3,3,3-tetrafluoropropene and from 1% to 40% of 1,1,1,2-tetrafluoroethane.

13. The process as claimed in claim 7, comprising a process for heating a fluid or a body, wherein the temperature of the fluid or of the body heated is from 30° C. to 90° C.

14. The composition as claimed in claim 1, wherein the difference between the liquid saturation pressure and the vapor saturation pressure at a temperature of −5° C. is less than or equal to 5% of the liquid saturation pressure.

15. The composition as claimed in claim 1, comprising: from 1 to 12 weight % of (E)-1,1,1,4,4,4-hexafluorobut-2-ene and from 88 to 99 weight % of 1,3,3,3-tetrafluoropropene.

* * * * *